Dec. 1, 1936.                P. SCHROEDER                2,062,681
             APPARATUS FOR INCINERATING WASTE MATERIALS
                       Filed March 18, 1936
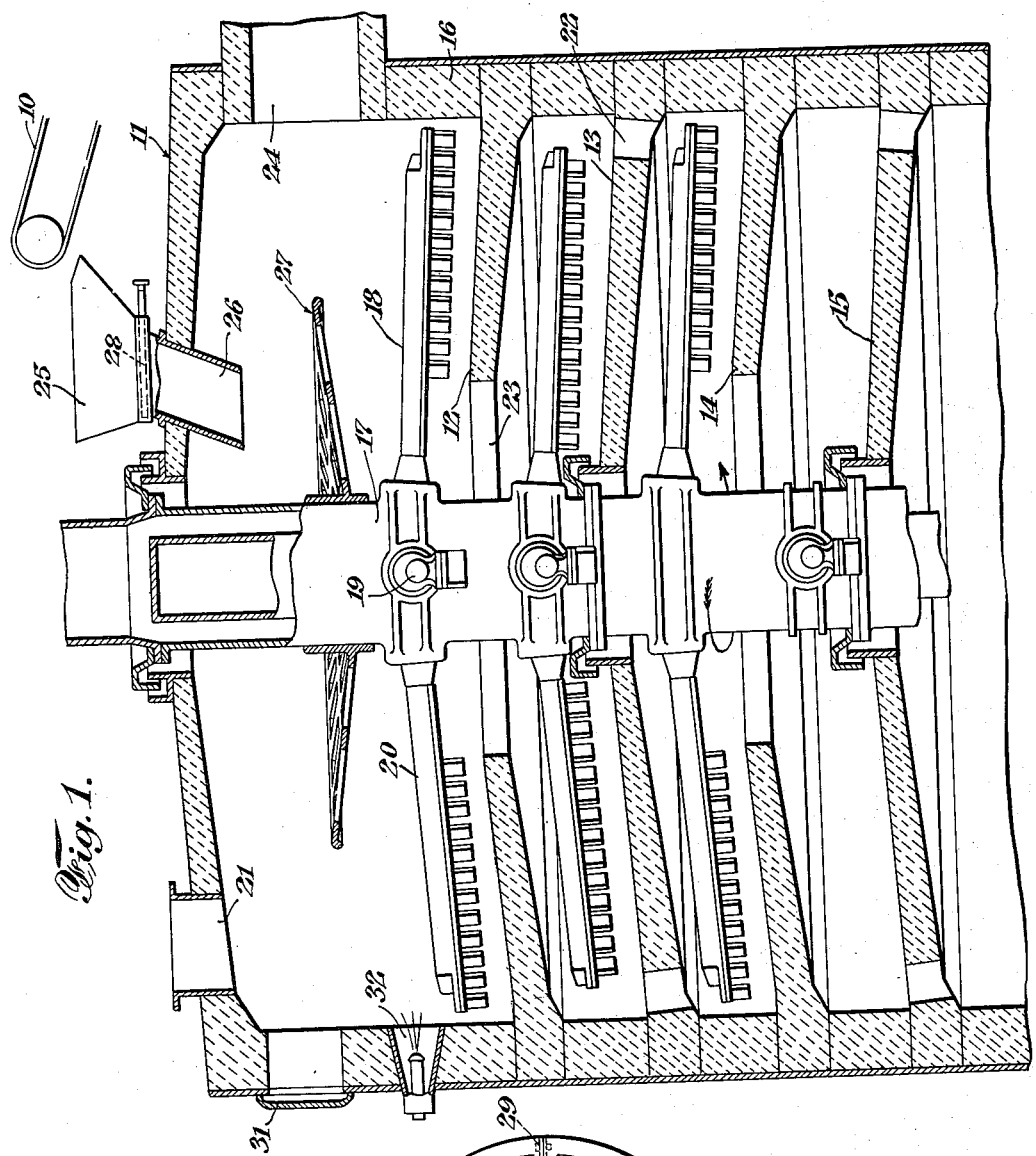
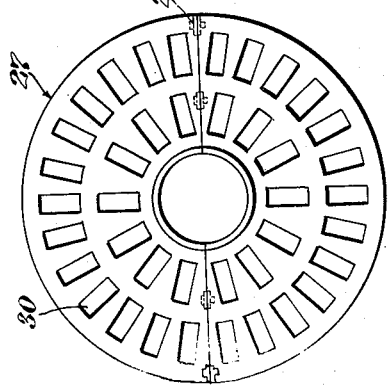
INVENTOR
*Pauline Schroeder*
BY
*Ward, Crosby & Neal*
ATTORNEYS Patented Dec. 1, 1936

2,062,681

UNITED STATES PATENT OFFICE 2,062,681

APPARATUS FOR INCINERATING WASTE MATERIALS

Pauline Schroeder, San Francisco, Calif., assignor to Nichols Engineering & Research Corporation, New York, N. Y., a corporation of Delaware Application March 18, 1936, Serial No. 69,477

4 Claims. (Cl. 110—13)

This invention relates to apparatus for incinerating sewage screenings or the like, preferably in conjunction with the incineration of other waste materials such as sewage sludge.

In sewage treatment plants it is customary to first pass the raw sewage through suitable screens in order to remove from the sewage, solid objects and materials such as tin cans, dead animals, pieces of wood and various kinds of fibrous and rubber material which would interfere at various stages with the proper and uniform treatment of the sewage. The disposal of these screenings in any efficient and economical way presents a serious problem. They usually have a water content in the neighborhood of 85% or more and involve an intertwined mass of the fibrous and other materials, which renders it difficult or impossible to quickly and thoroughly incinerate them in any of the usual types of furnaces. Because of the intertwined and adhering nature of the screenings as separated from the raw sewage, it is difficult to stoke or rabble the same in a furnace and the smoldering of large wet masses of this material evolves very offensive odors. My present invention provides an economical and simple means overcoming these difficulties.

In a number of sewage treatment plants a process for drying and incinerating the treated sewage sludge is being adopted involving the use of a multiple hearth furnace, arranged and used as disclosed in the patent to Baird and Rowen, No. 2,015,050, granted September 17, 1935. My invention in its preferred form involves apparatus for the incineration of the screening in conjunction with the incineration of the sewage sludge as carried out in accordance with said patent. The combining in this manner of the screenings incineration with the incineration of the sewage sludge or other waste materials, involves very substantial advantages in economy, efficiency and elimination of odors.

Various further and more specific objects, features and advantages will clearly appear from the detailed description given below taken in connection with the accompanying drawing which forms a part of this specification and illustrates merely by way of example a preferred form of the apparatus of the invention.

The invention consists in such novel features, arrangements and combinations of parts as may be shown and described in connection with the apparatus herein disclosed.

In the drawing, Fig. 1 is a vertical sectional view partly broken away, illustrating a preferred embodiment of the invention; and Fig. 2 is a plan view showing a preferred form of grate upon which the screenings are incinerated in the apparatus of Fig. 1.

The screenings which are accumulated from the raw sewage on screens are preferably delivered to a receiving plate where an attendant removes all large and incombustible objects. The remainder of the material may then be deposited on a belt conveyor as indicated at 10 in Fig. 1 for carrying the same to the top of an incinerating furnace 11.

The furnace 11 preferably includes the features of construction shown and described in the above mentioned Baird et al. patent and may comprise a plurality of superposed hearths as at 12, 13, 14 and 15 mounted within a cylindrical wall 16. A vertically extending rotatable shaft 17 may be provided at the center of the furnace for carrying a plurality of rabble arms as at 18, 19 and 20. The rabble teeth carried by these arms cooperate with each of the hearths for rabbling the sewage sludge, admitted through an opening 21, over each of the hearths in succession down through the furnace and in the presence of a countercurrent stream of hot gases rising up through the furnace over each of the hearths and through peripheral and central discharge openings as at 22 and 23 located respectively in alternate hearths. The exit gases from the furnace may pass out through an opening 24 to a recuperator or other heat economizing equipment such as disclosed in said Baird et al. patent.

From the conveyor 10 the screenings may fall into a hopper 25, thence through an inlet 26 to a grate member 27, which embraces the central shaft 17 and is secured thereto in any suitable manner for rotation with the shaft. The hopper 25 may be provided with a suitable sliding gate or equivalent means 28 for closing the inlet 26 at times when no screenings are being admitted. If desired, such a gate may be provided to automatically open and close at short intervals.

As indicated in Fig. 2, the grate 27 may be made in two parts secured together by suitable lugs and bolts as at 29. This grate is preferably cast in the form shown from a suitable heat resisting metal. As indicated in Fig. 1, the grate is preferably somewhat dished downwardly toward its mid portion so that the screenings falling thereon will have no tendency to slide off before being incinerated. Its somewhat conical shape also serves to give the grate further strength and rigidity. The grate may be formed with perforations as at 30 of a size small enough to prevent any substantial amount of the screenings from falling through until the same have become incinerated or charred to a degree such that they will break apart upon falling through the grate.

A door as at 31 may be provided, preferably in a side wall of the furnace near the top, to permit an attendant to stoke or stir, from time to time, the screenings being incinerated on the grate. In some cases it may be found desirable to provide a gas burner as at 32 within the top of the furnace for insuring a temperature sufficiently high in the vicinity of the grate to hasten the incineration and to cause decomposition of all odoriferous gases arising from the screenings as well as any gases arising from the lower part of the furnace which may not have been previously heated to a sufficient temperature to destroy the odors thereof.

The operation of the equipment in so far as concerns the incineration of sewage sludge is substantially as set forth in the above mentioned Baird et al. patent and hence need not be repeated here. The adhering or intertwined screenings as received in the hopper 25 may be from time to time admitted or continuously admitted through the screenings inlet 26 to the grate 27. Due to the fact that the grate is rotating with the shaft 17, the screenings as falling on the grate will be distributed to a considerable extent over the surface of the grate. Thus the depositing of the material in one large mass difficult to incinerate is avoided. The rotation of the grate has the further advantage that despite possible substantial differences in temperature at different parts of the space above the hearth 12, all portions of the material on the grate due to its rotation will be substantially uniformly subjected to the highest temperatures available in the streams of hot gases within this space. Furthermore, the grate being rotatable, permits the attendant to have ready access through the door 31, from time to time, with a suitable stoking rod or the like, to all parts of the grate.

For the thorough elimination of odors from the gases passing out of the outlet 24, they preferably should be raised to a temperature in the neighborhood of 1100° F. or higher. With the normal operation of the equipment for incinerating the sewage sludge and without a burner at 32, the gases between the shaft 17 and the outlet 24 may very readily be made to be at such a temperature. At the same time the temperature of the gases at the left hand side of the shaft may be somewhat lower. In cases where an exceptionally large amount of the screenings is to be incinerated, or if for any other reason extra heat is required, the burner at 32 may be used for maintaining the entire space above the hearth 12 at a temperature of 1100° F. or higher. At this temperature the screenings will be rapidly burned and the charred product will fall through the grate openings onto the hearths below where it will be mixed with the sewage sludge being rabbled, dried and incinerated. These charred particles as mixed with the sewage sludge involve no further difficulty and any unburned portion thereof may be thoroughly burned to the extent of eliminating all organic matter in conjunction with the incineration of the sewage sludge at the lower hearths. Thus by supporting the sewage screenings on the rotatable grate until they are partially or largely burned, all troubles in attempting to rabble the same in uncharred form with the sewer sludge, are avoided.

While the invention has been described in detail with respect to a particular preferred example, it will be understood by those skilled in the art after understanding the invention, that various changes and further modifications may be made without departing from the spirit and scope of the invention, and it is intended therefore in the appended claims to cover all such changes and modifications.

What is claimed as new and desired to be secured by Letters Patent is:

1. Apparatus for incinerating sewage screenings in conjunction with the incineration of sewage sludge, comprising a furnace structure having a plurality of superposed hearths, means for introducing sewage sludge onto an upper hearth, means including a rotatable shaft extending vertically of the furnace and rabbling means thereon for rabbling the sludge successively over the various hearths and down through the furnace in the presence of a stream of gas heated to a temperature to cause thorough drying and incineration of the sludge, and a grate member encircling said shaft and mounted to rotate therewith at a point above said upper hearth, the top of the furnace being formed with an opening above said grate for permitting sewage screenings to be admitted and distributed on said grate, the structure being also formed with gas ports permitting said heated gas to rise into contact with the screenings on said grate.

2. Apparatus for incinerating sewage screenings in conjunction with the incineration of sewage sludge, comprising a furnace structure having a plurality of superposed hearths, means for introducing sewage sludge onto an upper hearth, means including a rotatable shaft extending vertically of the furnace and rabbling means thereon for rabbling the sludge successively over the various hearths and down through the furnace in the presence of a stream of gas heated to a temperature to cause thorough drying and incineration of the sludge, a grate member encircling said shaft and mounted to rotate therewith in the presence of said heated gas, and means for admitting sewage screenings onto said gate.

3. Apparatus for incinerating sewage screenings in conjunction with the incineration of sewage sludge, comprising a furnace structure having a plurality of superposed hearths, means for introducing sewage sludge onto an upper hearth, means including a rotatable shaft extending vertically of the furnace and rabbling means thereon for rabbling the sludge successively over the various hearths and down through the furnace in the presence of a stream of gas heated to a temperature to cause thorough drying and incineration of the sludge, a grate member encircling said shaft and mounted to rotate therewith in the presence of said heated gas, and means for admitting sewage screenings onto said grate, the side walls of the furnace structure being formed with an opening opposite said grate to permit stoking of screenings thereon.

4. Apparatus for incinerating sewage screenings in conjunction with the incineration of sewage sludge or similar waste material, comprising a furnace structure, a hearth therein, means for introducing said waste material onto said hearth, means including a rotatable shaft extending vertically of said hearth and rabbling means thereon for rabbling said waste material over the surface of said hearth and from said hearth, in the presence of a stream of hot gases, a member for receiving sewage screenings encircling said shaft and mounted to rotate therewith in the presence of said heated gases, and means for admitting sewage screenings onto said member.

PAULINE SCHROEDER.